US012463456B2

(12) United States Patent
Brochtrup et al.

(10) Patent No.: US 12,463,456 B2
(45) Date of Patent: Nov. 4, 2025

(54) PORTABLE POWER SUPPLY WITH BIDIRECTIONAL CHARGING AND PASSTHROUGH

(71) Applicant: MILWAUKEE ELECTRIC TOOL CORPORATION, Brookfield, WI (US)

(72) Inventors: David Brochtrup, Menomonee Falls, WI (US); Logan Manderle, Milwaukee, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 173 days.

(21) Appl. No.: 18/364,640

(22) Filed: Aug. 3, 2023

(65) Prior Publication Data

US 2024/0055891 A1 Feb. 15, 2024

Related U.S. Application Data

(60) Provisional application No. 63/383,529, filed on Nov. 14, 2022, provisional application No. 63/397,027, filed on Aug. 11, 2022.

(51) Int. Cl.
*H02J 9/06* (2006.01)
*H02M 1/44* (2007.01)
*H02M 7/537* (2006.01)

(52) U.S. Cl.
CPC .............. *H02J 9/062* (2013.01); *H02M 1/44* (2013.01); *H02M 7/537* (2013.01)

(58) Field of Classification Search
CPC ........... H02J 9/062; H02M 1/44; H02M 7/537
See application file for complete search history.

(56) References Cited

U.S. PATENT DOCUMENTS

| | | |
|---|---|---|
| 3,440,514 A | 4/1969 | Fenley |
| 5,218,288 A | 6/1993 | Mickal et al. |
| 7,616,460 B2 | 11/2009 | Huang |
| 7,838,142 B2 | 11/2010 | Scheucher |
| 7,948,207 B2 | 5/2011 | Scheucher |
| 7,990,102 B2 | 8/2011 | Scheucher |
| 8,025,118 B2 | 9/2011 | Scheucher |

(Continued)

FOREIGN PATENT DOCUMENTS

| | | |
|---|---|---|
| CN | 201549929 U | 8/2010 |
| CN | 201904645 U | 7/2011 |

(Continued)

OTHER PUBLICATIONS

US 8,879,287 B2, 11/2014, Rastogi et al. (withdrawn)
Extended European Search Report for Application No. 23190041.6 dated Feb. 1, 2024 (10 pages).

*Primary Examiner* — Carlos Amaya
(74) *Attorney, Agent, or Firm* — Michael Best & Friedrich LLP

(57) ABSTRACT

A portable power supply including an alternating current ("AC") power input interface, an AC power output interface, and a battery core. The power supply further includes at least one switch. The at least one switch is electrically connected between the AC power input interface and the battery core. The power supply also includes a controller configured to control the at least one switch to selectively provide an AC power output to the AC power output interface based on power received from either the AC power input interface or the battery core.

19 Claims, 12 Drawing Sheets

(56) References Cited

U.S. PATENT DOCUMENTS

| | | |
|---|---|---|
| 8,026,698 B2 | 9/2011 | Scheucher |
| 8,033,686 B2 | 10/2011 | Recker et al. |
| 8,084,154 B2 | 12/2011 | Scheucher |
| 8,131,145 B2 | 3/2012 | Scheucher |
| 8,203,445 B2 | 6/2012 | Recker et al. |
| 8,362,713 B2 | 1/2013 | Recker et al. |
| 8,415,901 B2 | 4/2013 | Recker et al. |
| 8,491,159 B2 | 7/2013 | Recker et al. |
| 8,519,566 B2 | 8/2013 | Recker et al. |
| 8,669,716 B2 | 3/2014 | Recker et al. |
| 8,698,452 B2 | 4/2014 | Scheucher |
| 8,710,795 B2 | 4/2014 | Scheucher |
| 8,729,865 B2 | 5/2014 | Scheucher |
| 8,764,242 B2 | 7/2014 | Recker et al. |
| 8,796,987 B2 | 8/2014 | Scheucher |
| 8,815,424 B2 | 8/2014 | Scheucher |
| 8,829,799 B2 | 9/2014 | Recker et al. |
| 8,860,377 B2 | 10/2014 | Scheucher |
| 8,872,474 B2 | 10/2014 | Scheucher |
| 8,970,164 B2 | 3/2015 | Scheucher |
| 8,987,938 B2 | 3/2015 | Eschrich et al. |
| 8,994,276 B2 | 3/2015 | Recker et al. |
| 9,059,447 B2 | 6/2015 | Scheucher |
| 9,066,393 B2 | 6/2015 | Recker et al. |
| 9,074,736 B2 | 7/2015 | Recker et al. |
| 9,078,313 B2 | 7/2015 | Recker et al. |
| 9,089,016 B2 | 7/2015 | Recker et al. |
| 9,236,767 B2 | 1/2016 | Recker et al. |
| 9,247,623 B2 | 1/2016 | Recker et al. |
| 9,247,625 B2 | 1/2016 | Recker et al. |
| 9,252,595 B2 | 2/2016 | Recker et al. |
| 9,338,839 B2 | 5/2016 | Recker et al. |
| 9,342,967 B2 | 5/2016 | Recker et al. |
| 9,351,353 B2 | 5/2016 | Recker et al. |
| 9,381,822 B2 | 7/2016 | Scheucher |
| 9,392,669 B2 | 7/2016 | Recker et al. |
| 9,419,443 B2 | 8/2016 | Leabman |
| 9,509,156 B2 | 11/2016 | Takao et al. |
| 9,537,357 B2 | 1/2017 | Leabman |
| 9,537,358 B2 | 1/2017 | Leabman |
| 9,543,788 B2 | 1/2017 | Recker et al. |
| 9,655,217 B2 | 5/2017 | Recker et al. |
| 9,680,334 B2 | 6/2017 | Toya et al. |
| 9,793,758 B2 | 10/2017 | Leabman |
| 9,807,858 B2 | 10/2017 | Recker et al. |
| 9,825,674 B1 | 11/2017 | Leabman |
| 9,843,229 B2 | 12/2017 | Leabman |
| 9,853,692 B1 | 12/2017 | Bell et al. |
| 9,859,756 B2 | 1/2018 | Leabman et al. |
| 9,859,758 B1 | 1/2018 | Leabman |
| 9,860,965 B2 | 1/2018 | Recker et al. |
| 9,876,536 B1 | 1/2018 | Bell et al. |
| 9,882,427 B2 | 1/2018 | Leabman et al. |
| 9,887,739 B2 | 2/2018 | Leabman et al. |
| 9,893,768 B2 | 2/2018 | Leabman et al. |
| 9,900,057 B2 | 2/2018 | Leabman et al. |
| 9,906,065 B2 | 2/2018 | Leabman et al. |
| 9,912,199 B2 | 3/2018 | Leabman et al. |
| 9,923,386 B1 | 3/2018 | Leabman et al. |
| 9,935,482 B1 | 4/2018 | Leabman et al. |
| 9,941,705 B2 | 4/2018 | Leabman |
| 9,941,707 B1 | 4/2018 | Leabman |
| 9,941,754 B2 | 4/2018 | Leabman et al. |
| 9,966,784 B2 | 5/2018 | Leabman |
| 9,973,021 B2 | 5/2018 | Leabman et al. |
| 9,991,706 B2 | 6/2018 | Brotto et al. |
| 10,003,211 B1 | 6/2018 | Leabman et al. |
| 10,004,128 B2 | 6/2018 | Recker et al. |
| 10,009,987 B2 | 6/2018 | Recker et al. |
| 10,015,866 B2 | 7/2018 | Recker et al. |
| 10,034,359 B2 | 7/2018 | Recker et al. |
| 10,044,182 B2 | 8/2018 | Takahashi et al. |
| 10,075,017 B2 | 9/2018 | Leabman et al. |
| 10,085,332 B2 | 9/2018 | Recker et al. |
| 10,090,699 B1 | 10/2018 | Leabman et al. |
| 10,098,211 B2 | 10/2018 | Recker et al. |
| 10,103,582 B2 | 10/2018 | Leabman et al. |
| 10,109,888 B2 | 10/2018 | Scheucher |
| 10,110,006 B2 | 10/2018 | Wood et al. |
| 10,117,315 B2 | 10/2018 | Recker et al. |
| 10,141,768 B2 | 11/2018 | Leabman et al. |
| 10,148,097 B1 | 12/2018 | Leabman et al. |
| 10,148,133 B2 | 12/2018 | Leabman et al. |
| 10,154,555 B2 | 12/2018 | Recker et al. |
| 10,158,257 B2 | 12/2018 | Leabman |
| 10,186,913 B2 | 1/2019 | Leabman et al. |
| 10,211,674 B1 | 2/2019 | Leabman et al. |
| 10,211,680 B2 | 2/2019 | Eabman et al. |
| 10,224,758 B2 | 3/2019 | Leabman et al. |
| 10,224,982 B1 | 3/2019 | Leabman et al. |
| 10,230,266 B1 | 3/2019 | Leabman et al. |
| 10,291,294 B2 | 5/2019 | Leabman |
| 10,342,104 B2 | 7/2019 | Recker et al. |
| 10,389,139 B2 | 8/2019 | Velderman et al. |
| 10,390,413 B2 | 8/2019 | Recker et al. |
| 10,448,489 B2 | 10/2019 | Recker et al. |
| 10,448,491 B1 | 10/2019 | Recker et al. |
| 10,485,078 B2 | 11/2019 | Recker et al. |
| 10,499,478 B2 | 12/2019 | Recker et al. |
| 10,516,301 B2 | 12/2019 | Leabman |
| 10,536,008 B2 | 1/2020 | Toya et al. |
| 10,601,244 B2 | 3/2020 | Recker et al. |
| 11,011,919 B2 | 5/2021 | Velderman et al. |
| 11,031,795 B2 | 6/2021 | Velderman et al. |
| 11,034,261 B2 | 6/2021 | Landreth |
| 11,129,246 B2 | 9/2021 | Recker et al. |
| 11,251,623 B2 | 2/2022 | Kohler et al. |
| 12,142,930 B2* | 11/2024 | Ford .................. G05B 15/02 |
| 2005/0074665 A1 | 4/2005 | Spaziante et al. |
| 2007/0273325 A1 | 11/2007 | Krieger et al. |
| 2008/0266913 A1* | 10/2008 | Brotto .................. H02J 7/0042 |
| | | 363/60 |
| 2012/0098439 A1 | 4/2012 | Recker et al. |
| 2014/0008993 A1 | 1/2014 | Leabman |
| 2014/0354063 A1 | 12/2014 | Leabman et al. |
| 2014/0368048 A1 | 12/2014 | Leabman et al. |
| 2014/0368161 A1 | 12/2014 | Leabman et al. |
| 2014/0375253 A1 | 12/2014 | Leabman et al. |
| 2015/0015192 A1 | 1/2015 | Leabman et al. |
| 2015/0022008 A1 | 1/2015 | Leabman et al. |
| 2015/0130285 A1 | 5/2015 | Leabman et al. |
| 2015/0155738 A1 | 6/2015 | Leabman et al. |
| 2015/0162751 A1 | 6/2015 | Leabman et al. |
| 2015/0188362 A1* | 7/2015 | Mondal ............... H02M 3/156 |
| | | 307/52 |
| 2015/0222126 A1 | 8/2015 | Leabman et al. |
| 2015/0318729 A1 | 11/2015 | Leabman |
| 2015/0326026 A1 | 11/2015 | Leabman |
| 2015/0333528 A1 | 11/2015 | Leabman |
| 2015/0333573 A1 | 11/2015 | Leabman |
| 2016/0099590 A1 | 4/2016 | Velderman et al. |
| 2016/0241045 A1 | 8/2016 | Leabman |
| 2018/0177032 A1 | 6/2018 | Recker et al. |
| 2018/0226840 A1 | 8/2018 | Leabman et al. |
| 2019/0051947 A1 | 2/2019 | Scheucher |
| 2019/0067989 A1* | 2/2019 | Beg .................. H02J 3/381 |
| 2019/0152344 A1 | 5/2019 | Landreth |
| 2019/0237991 A1 | 8/2019 | Baldizon Diaz |
| 2019/0372354 A1* | 12/2019 | Kohler ................ B25F 5/00 |
| 2019/0393928 A1 | 12/2019 | Leabman |
| 2020/0112182 A1 | 4/2020 | Toya et al. |
| 2020/0274364 A1 | 8/2020 | Kumar et al. |
| 2021/0020964 A1 | 1/2021 | Shaw et al. |
| 2021/0213806 A1 | 7/2021 | Saroka et al. |

FOREIGN PATENT DOCUMENTS

| | | |
|---|---|---|
| CN | 201918758 U | 8/2011 |
| CN | 206077014 U | 4/2017 |
| CN | 206506354 U | 9/2017 |
| CN | 211880102 U | 11/2020 |

(56) References Cited

FOREIGN PATENT DOCUMENTS

WO         9016105 A1   12/1990
WO   2019089886 A2    5/2019

\* cited by examiner

PORTABLE POWER SUPPLY WITH BIDIRECTIONAL CHARGING AND PASSTHROUGH

RELATED APPLICATIONS

This application claims the benefit of U.S. Provisional Patent Application No. 63/397,027, filed Aug. 11, 2022, and U.S. Provisional Patent Application No. 63/383,529, filed Nov. 14, 2022, the entire content of each of which is hereby incorporated by reference.

FIELD

Embodiments herein relate to portable power supplies.

SUMMARY

Portable power supplies described herein include an alternating current ("AC") power input interface, an AC power output interface, a direct current ("DC") power output interface, and a battery core configured to provide DC power to the DC power output interface. The power supply further includes at least one switch including a first switch, a second switch, and a third switch. The first switch is electrically connected between the AC power input interface and the battery core. The second switch is electrically connected between the AC power input interface and the AC power output interface. The third switch is electrically connected between the battery core and the AC power output interface. The power supply also includes a controller configured to control the at least one switch to selectively provide an AC power output to the AC power output interface based on power received from either the AC power input interface or the battery core.

In some aspects, the portable power supplies described herein further include an electromagnetic interference ("EMI") filter electrically connected between the AC power input and the first switch and a voltage converter electrically connected between the first switch and the battery core.

In some aspects, the portable power supplies described herein further include an output filter including an inductor, and a capacitor, the output filter electrically connected between the voltage converter and the AC power output interface.

In some aspects, the portable power supplies described herein further include an inductor-capacitor-inductor ("LCL") filter electrically connected between the first switch and the voltage converter.

In some aspects, the at least one switch further includes a second switch and a third switch, the second switch is electrically connected between the AC power input interface and the AC power output interface, and the third switch is electrically connected between the battery core and the AC power output interface.

In some aspects, the portable power supplies described herein further include an electromagnetic interference ("EMI") filter electrically connected between the AC power input and the first switch, and a voltage converter electrically connected between the first switch, the third switch, and the battery core.

In some aspects, the portable power supplies described herein further include an output filter including an inductor, a capacitor, and a fourth switch, the output filter electrically connected between the voltage converter and the third switch.

In some aspects, the battery core has a maximum voltage of at least 400V.

In some aspects, the portable power supplies described herein further include a low frequency isolation transformer electrically connected between the output filter, the first switch, and the third switch.

In some aspects, the portable power supplies described herein further include a DC-DC power converter electrically connected between the voltage converter and the battery core.

In some aspects, the battery core has a maximum voltage of less than 400V.

In some aspects, the DC-DC power converter includes a high-frequency isolation transformer.

In some aspects, the controller is further configured to determine whether AC power is present at the AC power input interface, determine, in response to AC power being present at the AC power input interface, a state of charge of the battery core, and control, in response to the state of charge of the battery core being less than fully charged, the portable power supply in an AC passthrough mode, wherein, when in the AC passthrough mode, the first switch is closed, the second switch is closed, and the third switch is open.

In some aspects, the controller is further configured to determine whether AC power is present at the AC power input interface, determine, in response to AC power being present at the AC power input interface, a state of charge of the battery core, control, in response to the state of charge of the battery core being fully charged, the portable power supply in an AC bypass mode, wherein, when in the AC bypass mode, the first switch is open, the second switch is closed, and the third switch is open.

In some aspects, the controller is further configured to determine whether AC power is present at the AC power input interface, determine, in response to AC power not being present at the AC power input interface, whether AC power is requested at the AC power output interface, control, in response to determining that AC power is requested at the AC power output interface, the portable power supply in a DC discharge mode, wherein, when in the DC discharge mode, the first switch is open, the second switch is open, and the third switch is closed.

In some aspects, the controller is further configured to determine whether AC power is present at the AC power input interface, determine, in response to AC power not being present at the AC power input interface, whether AC power is requested at the AC power output interface, control, in response to determining that AC power is not requested at the AC power output interface, the portable power supply in an idle mode, wherein, when in the idle mode, the first switch is open, the second switch is open, and the third switch is open.

In some aspects, the controller is further configured to determine whether AC power is present at the AC power input interface, determine, in response to AC power being present at the AC power input interface, a state of charge of the battery core, and control, in response to the state of charge of the battery core being less than fully charged, the portable power supply in an AC passthrough mode, wherein, when in the AC passthrough mode, the first switch is closed, and a voltage converter electrically connected between the first switch and the battery core is enabled.

In some aspects, the controller is further configured to determine whether AC power is present at the AC power input interface, determine, in response to AC power being present at the AC power input interface, a state of charge of the battery core, control, in response to the state of charge of the battery core being fully charged, the portable power supply in an AC bypass mode, wherein, when in the AC bypass mode, the first switch is closed, and a voltage converter electrically connected between the first switch and the battery core is disabled.

In some aspects, the controller is further configured to determine whether AC power is present at the AC power input interface, determine, in response to AC power not being present at the AC power input interface, whether AC power is requested at the AC power output interface, control, in response to determining that AC power is requested at the AC power output interface, the portable power supply in a DC discharge mode, wherein, when in the DC discharge mode, the first switch is open, and a voltage converter electrically connected between the first switch and the battery core is enabled.

In some aspects, the controller is further configured to determine whether AC power is present at the AC power input interface, determine, in response to AC power not being present at the AC power input interface, whether AC power is requested at the AC power output interface, control, in response to determining that AC power is not requested at the AC power output interface, the portable power supply in an idle mode, wherein, when in the idle mode, the first switch is open, and a voltage converter electrically connected between the first switch and the battery core is disabled.

Methods described herein include receiving power from either an alternating current ("AC") power input interface of the portable power supply or a battery core of the power supply, and controlling at least one switch of the portable power supply to selectively provide an AC power output to an AC power output interface based on power received from either the AC power input interface of the portable power supply or the battery core of the portable power supply, the at least one switch including a first switch electrically connected between the AC power input interface and the battery core.

In some aspects, the methods described herein further include determining whether AC power is present at the AC power input interface, determining, in response to AC power being present at the AC power input interface, a state of charge of the battery core, and controlling, in response to the state of charge of the battery core being less than fully charged, the at least one switch for operation of the portable power supply in an AC passthrough mode, wherein, when in the AC passthrough mode, AC power is provided from the AC power input interface to the AC power output interface and the battery core.

In some aspects, when in the AC passthrough mode, the first switch is closed, a second switch electrically connected between the AC power input interface and the AC power output interface is closed, and a third switch electrically connected between the battery core and the AC power output interface is open.

In some aspects, when in the AC passthrough mode, the first switch is closed, and a voltage converter electrically connected between the first switch and the battery core is enabled.

In some aspects, the methods described herein further include determining whether AC power is present at the AC power input interface, determining, in response to AC power being present at the AC power input interface, a state of charge of the battery core, controlling, in response to the state of charge of the battery core being fully charged, the at least one switch for operation of the portable power supply in an AC bypass mode, wherein, when in the AC bypass mode, AC power is provided from the AC power input interface to the AC power output interface.

In some aspects, when in the AC bypass mode, the first switch is open, a second switch electrically connected between the AC power input interface and the AC power output interface is closed, and a third switch electrically connected between the battery core and the AC power output interface is open.

In some aspects, when in the AC bypass mode, the first switch is closed, and a voltage converter electrically connected between the first switch and the battery core is disabled.

In some aspects, the methods described herein further include determining whether AC power is present at the AC power input interface, determining, in response to AC power not being present at the AC power input interface, whether AC power is requested at the AC power output interface, controlling, in response to determining that AC power is requested at the AC power output interface, at least one switch for operation of the portable power supply in a DC discharge mode, wherein, when in the DC discharge mode, power is provided from the battery core to the AC power output interface.

In some aspects, when in the DC discharge mode, the first switch is open, a second switch electrically connected between the AC power input interface and the AC power output interface is open, and a third switch electrically connected between the battery core and the AC power output interface is closed.

In some aspects, when in the DC discharge mode, the first switch is open, and a voltage converter electrically connected between the first switch and the battery core is enabled.

In some aspects, the methods described herein further include determining whether AC power is present at the AC power input interface; determining, in response to AC power not being present at the AC power input interface, whether AC power is requested at the AC power output interface; controlling, in response to determining that AC power is not requested at the AC power output interface, at least one switch for operation of the portable power supply in an idle mode, wherein, when in the idle mode, power is provided to neither the AC power output interface nor the battery core.

In some aspects, when in the idle mode, the first switch is open, a second switch electrically connected between the AC power input interface and the AC power output interface is open, and a third switch electrically connected between the battery core and the AC power output interface is open.

In some aspects, when in the idle mode, the first switch is open, and a voltage converter electrically connected between the first switch and the battery core is disabled.

Portable power supplies described herein include an internal power source configured to provide power to a device connected to the portable power supply, a power input interface configured to charge the internal power source, a power output interface, at least one switch including a first switch electrically connected between the power input interface and the internal power source, and a controller configured to determine whether power is present at the power input interface, and control at least one switch of the portable power supply to selectively provide power to a power output interface from either the power input interface or the internal power source based on the determination In some aspects, the controller is further configured to determine, in response to power being present at the power input interface, a state of charge of the internal power source, and control, in response to the state of charge of the internal power source being less than a threshold, the at least one switch for operation of the portable power supply in a passthrough mode, wherein, when in the passthrough mode, power is provided from the power input interface to the power output interface and the internal power source.

In some aspects, the controller is further configured to determine, in response to power being present at the power input interface, a state of charge of the internal power source, and controlling, in response to the state of charge of the internal power source meeting or exceeding a threshold, the at least one switch for operation of the portable power supply in a bypass mode, wherein, when in the bypass mode, power is provided from the power input interface to the power output interface.

In some aspects, the controller is further configured to determine, in response to power not being present at the power input interface, whether power is requested at the power output interface, control, in response to determining that power is requested at the power output interface, the at least one switch for operation of the portable power supply in a discharge mode, wherein, when in the discharge mode, power is provided from the internal power source to the power output interface.

In some aspects, the controller is further configured to determine, in response to power not being present at the power input interface, whether power is requested at the power output interface, control, in response to determining that power is not requested at the power output interface, the at least one switch for operation of the portable power supply in an idle mode, wherein, when in the idle mode, power is provided to neither the power output interface the battery core.

Before any embodiments are explained in detail, it is to be understood that the embodiments are not limited in application to the details of the configurations and arrangements of components set forth in the following description or illustrated in the accompanying drawings. The embodiments are capable of being practiced or of being carried out in various ways. Also, it is to be understood that the phraseology and terminology used herein are for the purpose of description and should not be regarded as limiting. The use of "including," "comprising," or "having" and variations thereof are meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings.

Unless the context of their usage unambiguously indicates otherwise, the articles "a," "an," and "the" should not be interpreted as meaning "one" or "only one." Rather these articles should be interpreted as meaning "at least one" or "one or more." Likewise, when the terms "the" or "said" are used to refer to a noun previously introduced by the indefinite article "a" or "an," "the" and "said" mean "at least one" or "one or more" unless the usage unambiguously indicates otherwise.

In addition, it should be understood that embodiments may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic-based aspects may be implemented in software (e.g., stored on non-transitory computer-readable medium) executable by one or more processing units, such as a microprocessor and/or application specific integrated circuits ("ASICs"). As such, it should be noted that a plurality of hardware and software based devices, as well as a plurality of different structural components, may be utilized to implement the embodiments. For example, "servers," "computing devices," "controllers," "processors," etc., described in the specification can include one or more processing units, one or more computer-readable medium modules, one or more input/output interfaces, and various connections (e.g., a system bus) connecting the components.

Relative terminology, such as, for example, "about," "approximately," "substantially," etc., used in connection with a quantity or condition would be understood by those of ordinary skill to be inclusive of the stated value and has the meaning dictated by the context (e.g., the term includes at least the degree of error associated with the measurement accuracy, tolerances [e.g., manufacturing, assembly, use, etc.] associated with the particular value, etc.). Such terminology should also be considered as disclosing the range defined by the absolute values of the two endpoints. For example, the expression "from about 2 to about 4" also discloses the range "from 2 to 4". The relative terminology may refer to plus or minus a percentage (e.g., 1%, 5%, 10%) of an indicated value.

It should be understood that although certain drawings illustrate hardware and software located within particular devices, these depictions are for illustrative purposes only. Functionality described herein as being performed by one component may be performed by multiple components in a distributed manner. Likewise, functionality performed by multiple components may be consolidated and performed by a single component. In some embodiments, the illustrated components may be combined or divided into separate software, firmware and/or hardware. For example, instead of being located within and performed by a single electronic processor, logic and processing may be distributed among multiple electronic processors. Regardless of how they are combined or divided, hardware and software components may be located on the same computing device or may be distributed among different computing devices connected by one or more networks or other suitable communication links. Similarly, a component described as performing particular functionality may also perform additional functionality not described herein. For example, a device or structure that is "configured" in a certain way is configured in at least that way but may also be configured in ways that are not explicitly listed.

Accordingly, in the claims, if an apparatus, method, or system is claimed, for example, as including a controller, control unit, electronic processor, computing device, logic element, module, memory module, communication channel or network, or other element configured in a certain manner, for example, to perform multiple functions, the claim or claim element should be interpreted as meaning one or more of such elements where any one of the one or more elements is configured as claimed, for example, to make any one or more of the recited multiple functions, such that the one or more elements, as a set, perform the multiple functions collectively.

Other aspects of the embodiments will become apparent by consideration of the detailed description and accompanying drawings.

DETAILED DESCRIPTION

Figure 1:
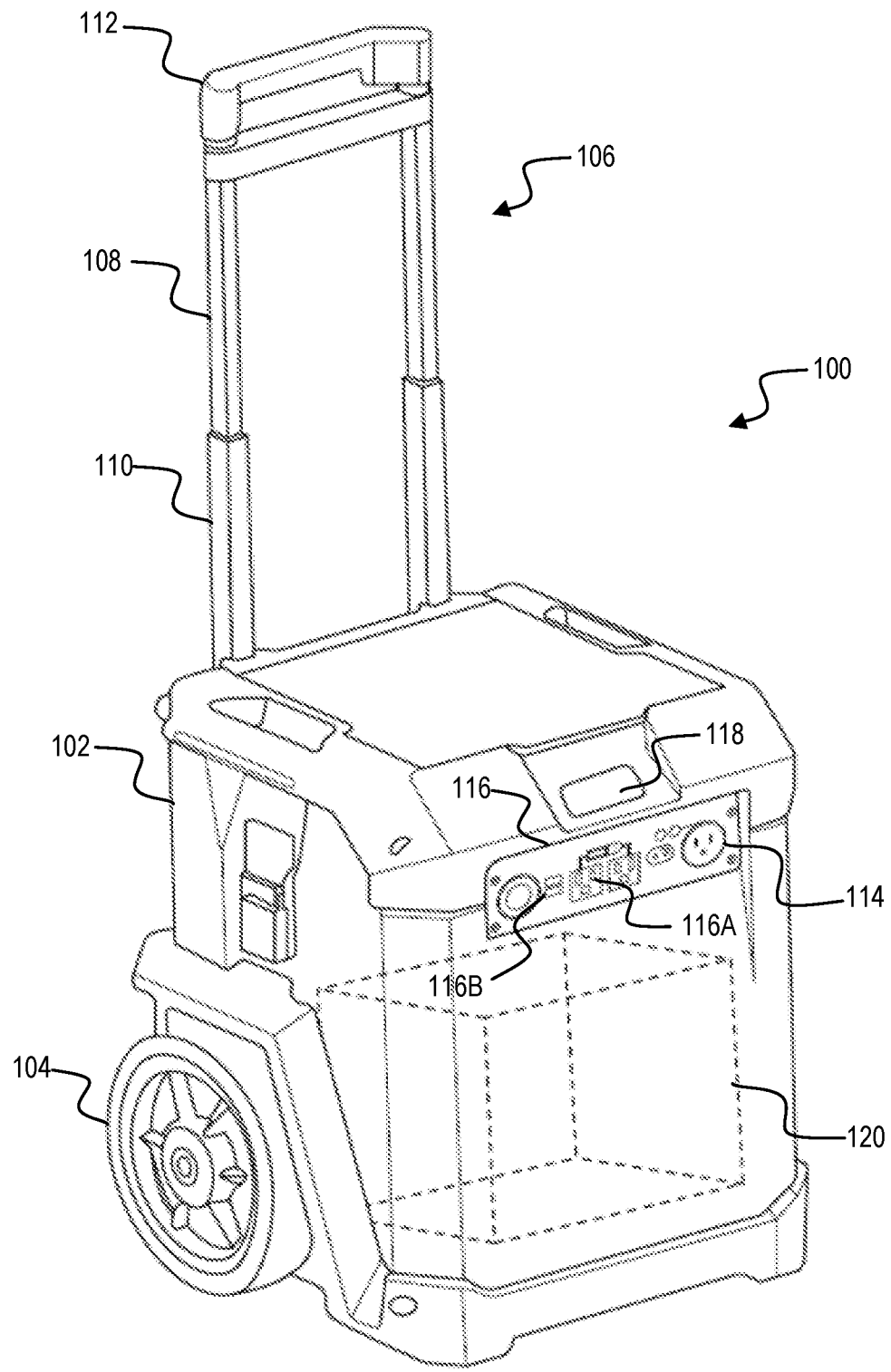
FIG. 1 illustrates a perspective view of a portable power supply device, according to some embodiments.

FIG. 1 illustrates a portable power supply device or power supply 100. The power supply 100 includes, among other things, a housing 102. In some embodiments, the housing 102 includes one or more wheels 104 and a handle assembly 106. The handle assembly 106 includes an inner tube 108 and an outer tube 110. The inner tube 108 fits inside the outer tube 110 and is slidable relative to the outer tube 110. The inner tube 108 is coupled to a horizontal holding member 112. The housing 102 of power supply 100 further includes an AC power input interface 114, a power output interface 116, and a display 118. In the illustrated embodiment, the AC power input interface 114 includes multiple electrical connection interfaces configured to receive power from an external power source. In some embodiments, the external power source is an AC power source. For example, the AC power source may be a conventional wall outlet, such as a 120 V outlet or a 240 V outlet, found in North America. As another example, the AC power source may be a conventional wall outlet, such as a 220V outlet or 230V outlet, found outside of North America. In some embodiments, the external power source is a DC power source. For example, the DC power source may be one or more photovoltaic cells (e.g., a solar panel), an electric vehicle (EV) charging station, or any other DC power source. In some embodiments, the AC power input interface 114 is replaced by or additionally includes a cable configured to plug into a conventional wall outlet. In some embodiments, the AC power input interface 114 further includes one or more devices, such as antennas or induction coils, configured to wirelessly receive power from an external power source. The power received by the AC power input interface 114 may be used to charge an internal power source or battery core 120, disposed within the housing 102 of power supply 100.

The power received by the AC power input interface 114 may also be used to provide passthrough power to one or more devices connected to the power output interface 116. The power output interface 116 includes one more power outlets. In the illustrated embodiment, the power output interface 116 includes a plurality of AC power outlets 116A and DC power outlets 116B. It should be understood that number of power outlets included in the power output interface 116 is not limited to the power outlets illustrated in FIG. 1. For example, in some embodiments of the power supply 100, the power output interface 116 may include more or fewer power outlets than the power outlets included in the illustrated embodiment of power supply 100.

In some embodiments, the power output interface 116 is configured to provide power output by the battery core 120 to one or more peripheral devices. In some embodiments, the power output interface 116 is configured to provide power provided by an external power source (e.g., from the power grid via the AC power input interface 114) directly to one or more peripheral devices. The one or more peripheral devices may be a smartphone, a tablet computer, a laptop computer, a portable music player, a power tool, a power tool battery pack, a power tool battery pack charger, or the like. The peripheral devices may be configured to receive DC and/or AC power from the power output interface 116.

The display 118 is configured to indicate a state of the power supply 100 to a user, such as state of charge of the battery core 120 and/or fault conditions. In some embodiments the display 118 includes one or more light-emitting diode ("LED") indicators configured to illuminate and display a current state of charge of battery core 120. In some embodiments, the display 118 is, for example, a liquid crystal display ("LCD"), a light-emitting diode ("LED") display, an organic LED ("OLED") display, an electroluminescent display ("ELD"), a surface-conduction electron-emitter display ("SED"), a field emission display ("FED"), a thin-film transistor ("TFT") LCD, etc. In other embodiments, the power supply 100 does not include a display.

Figure 2:
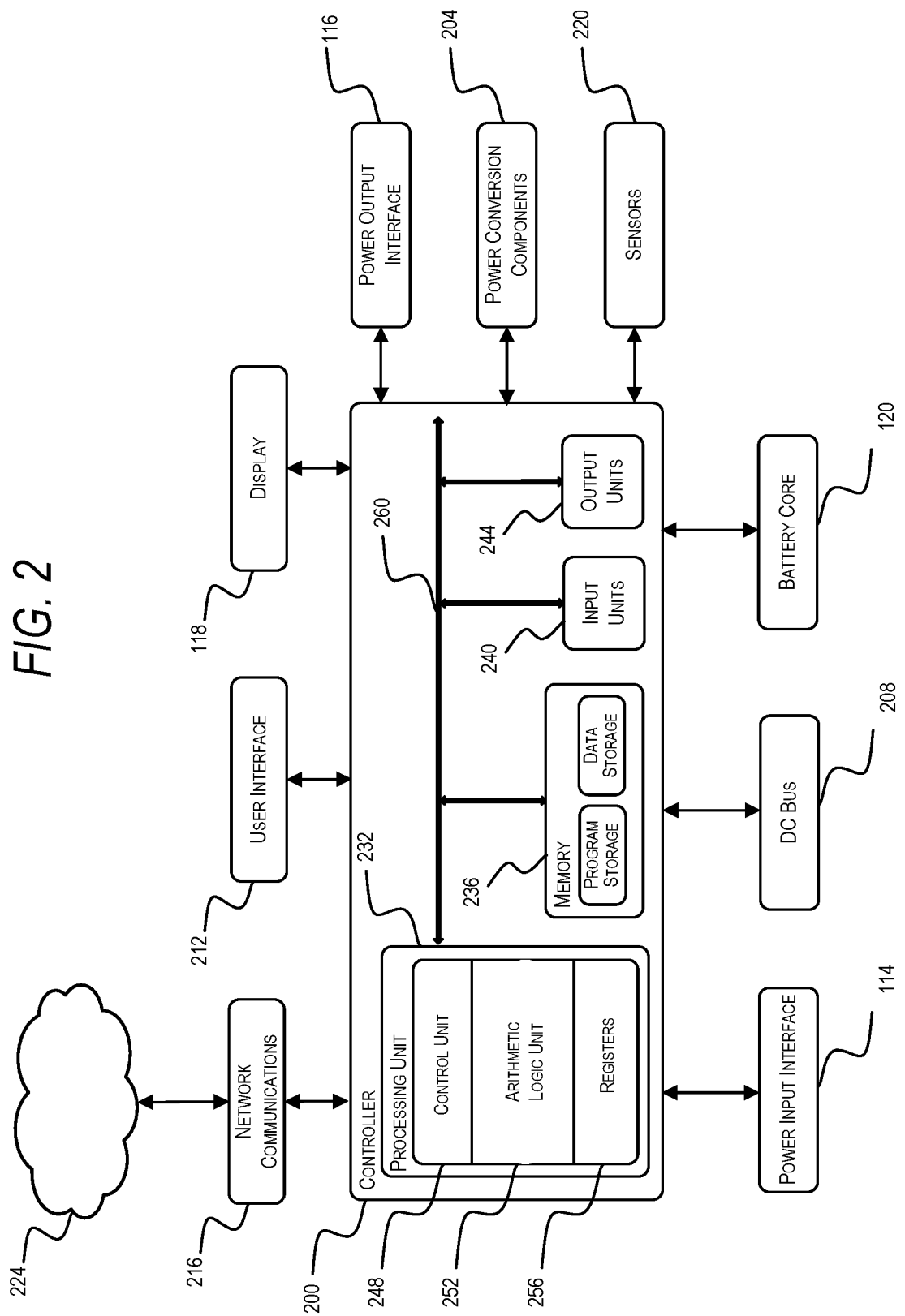
FIG. 2 illustrates a control system for the portable power supply device of FIG. 1, according to some embodiments.

FIG. 2 is a generalized schematic illustration of a controller 200 included in power supply 100. The controller 200 is electrically and/or communicatively connected to a variety of modules or components of the power supply 100. For example, the controller 200 may be connected to the AC power input interface 114, the power output interface 116, the display 118, and the battery core 120. Persons skilled in the art will recognize that electrical and/or communicative connection between the controller 200 and the battery core 120 includes electrical and/or communicative connection between the controller 200 and components included in the battery core 120, such as, but not limited to, a plurality of battery cell assemblies and components included therein.

The controller 200 is additionally electrically and/or communicatively connected to a plurality of power conversion components 204, a DC bus 208, a user interface 212, a network communications module 216, and a plurality of sensors 220. The power conversion components 204 will be described in greater detail below with reference to FIGS. 3-7.

The network communications module 216 is connected to a network 224 to enable the controller 200 to communicate with peripheral devices in the network 224, such as a smartphone or a server. The sensors 220 include, for example, one or more voltage sensors, one or more current sensors, one or more temperature sensors, and/or one or more additional sensors used for measuring electrical and/or other characteristics of the power supply 100. Each of the sensors 220 generates one or more output signals that are provided to the controller 200 for processing and evaluation. The user interface 212 is included to provide user control of the power supply 100. The user interface 212 can include any combination of digital and analog input devices required to achieve a desired level of control for the power supply 100. For example, the user interface 212 may include a plurality of knobs, a plurality of dials, a plurality of switches, a plurality of buttons, or the like. In some embodiments, the user interface 212 is integrated with the display 118 (e.g., as a touchscreen display 118).

The controller 200 includes combinations of hardware and software that are operable to, among other things, control the operation of the power supply 100, communicate over the network 224, receive input from a user via the user interface 212, provide information to a user via the display 118, etc. For example, the controller 200 includes, among other things, a processing unit 232 (e.g., a microprocessor, a microcontroller, an electronic processor, an electronic controller 200, or another suitable programmable device), a memory 236, input units 240, and output units 244. The processing unit 232 includes, among other things, a control unit 248, an arithmetic logic unit ("ALU") 252, and a plurality of registers 256, and is implemented using a known computer architecture (e.g., a modified Harvard architecture, a von Neumann architecture, etc.). The processing unit 232, the memory 236, the input units 240, and the output units 244, as well as the various modules or circuits connected to the controller 200 are connected by one or more control and/or data buses (e.g., common bus 260). The control and/or data buses are shown generally in FIG. 2 for illustrative purposes. Although the controller 200 is illustrated in FIG. 2 as one controller 200, the controller 200 could also include multiple controllers configured to work together to achieve a desired level of control for the power supply 100. As such, any control functions and processes described herein with respect to the controller 200 could also be performed by two or more controllers functioning in a distributed manner.

The memory 236 is a non-transitory computer readable medium and includes, for example, a program storage area and a data storage area. The program storage area and the data storage area can include combinations of different types of memory 236, such as a read only memory ("ROM"), a random access memory ("RAM") (e.g., dynamic RAM ["DRAM"], synchronous DRAM ["SDRAM"], etc.), electrically-erasable programmable ROM ("EEPROM"), flash memory, a hard disk, an SD card, or other suitable magnetic, optical, physical, or electronic memory devices. The processing unit 232 is connected to the memory 236 and is configured to execute software instructions that are capable of being stored in a RAM of the memory 236 (e.g., during execution), a ROM of the memory 236 (e.g., on a generally permanent basis), or another non-transitory computer readable medium such as another memory 236 or a disc. Software included in the implementation of the power supply 100 and controller 200 can be stored in the memory 236 of the controller 200. The software includes, for example, firmware, one or more applications, program data, filters, rules, one or more program modules, and other executable instructions. The controller 200 is configured to retrieve from the memory 236 and execute, among other things, instructions related to the control processes and methods described herein. In other embodiments, the controller 200 includes additional, fewer, or different components.

During operation of the power supply 100, the controller 200 is configured to monitor voltage, current, temperature, and/or other signals received from the various components described above. For example, the controller 200 is configured to monitor voltage signals received from the battery core 120 when the battery core 120 is charged by an external power source connected to the AC power input interface 114. As another example, the controller 200 is configured to monitor voltage signals received from the battery core 120 when the battery core 120 provides power to one or more peripheral devices connected to the power output interface 116.

Figure 3:
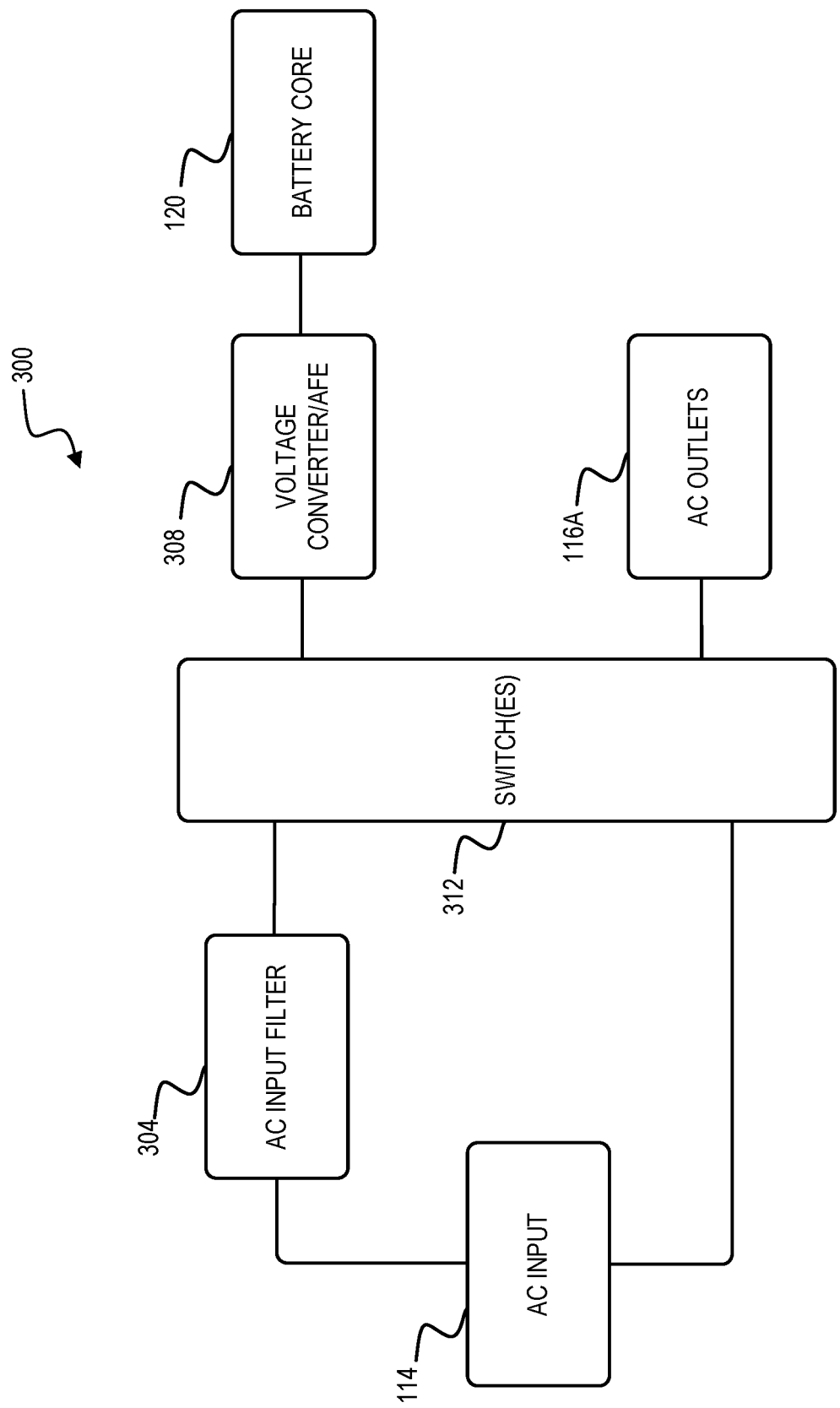
FIG. 3 illustrates a schematic diagram of a power system of the portable power supply device of FIG. 1, according to some embodiments.

FIG. 3 is a block diagram of a power system circuit 300 of the power supply 100 according to some embodiments. The power system circuit 300 includes the AC power input interface 114, an AC input filter 304, a voltage converter 308, the battery core 120, and the AC power outlets 116A. In some embodiments, the AC input filter 304 is an electromagnetic interference ("EMI") filter 304 electrically connected between the AC power input interface 114 and the voltage converter 308. The EMI filter 304 provides filtering from the AC input to reduce conducted and radiated emissions in the power system circuit 300. The voltage converter 308 may be an active front end ("AFE") drive circuit, and may alternatively be referred to herein as the AFE 308. The AFE 308 is configured to provide bidirectional power exchange to and from the battery core 120. For example, the AFE 308 can be configured to operate as a rectifier in order to charge the battery core 120 with power supplied by the AC power input interface 114, and can be configured to operate as an inverter in order to discharge power from the battery core 120 to the AC power outlets 116A. The power system circuit 300 further includes at least one switch 312 (e.g., a transistor, a toggle switch, an electrical switch, a mechanical switch, a relay, etc.) configured to electrically connect components of the power system circuit 300. In some embodiments, the power system circuit 300 provides for a reduced size, weight, and cost of the inverter system for the power supply 100 because charging and discharging of the battery core 120 can be achieved using the same switching devices and an inductor, as described below. By reducing the components in the power supply 100, less thermal management is also required. In some embodiments, the power supply 100 is configured to operate as an uninterruptable power supply (UPS).

Figure 4:
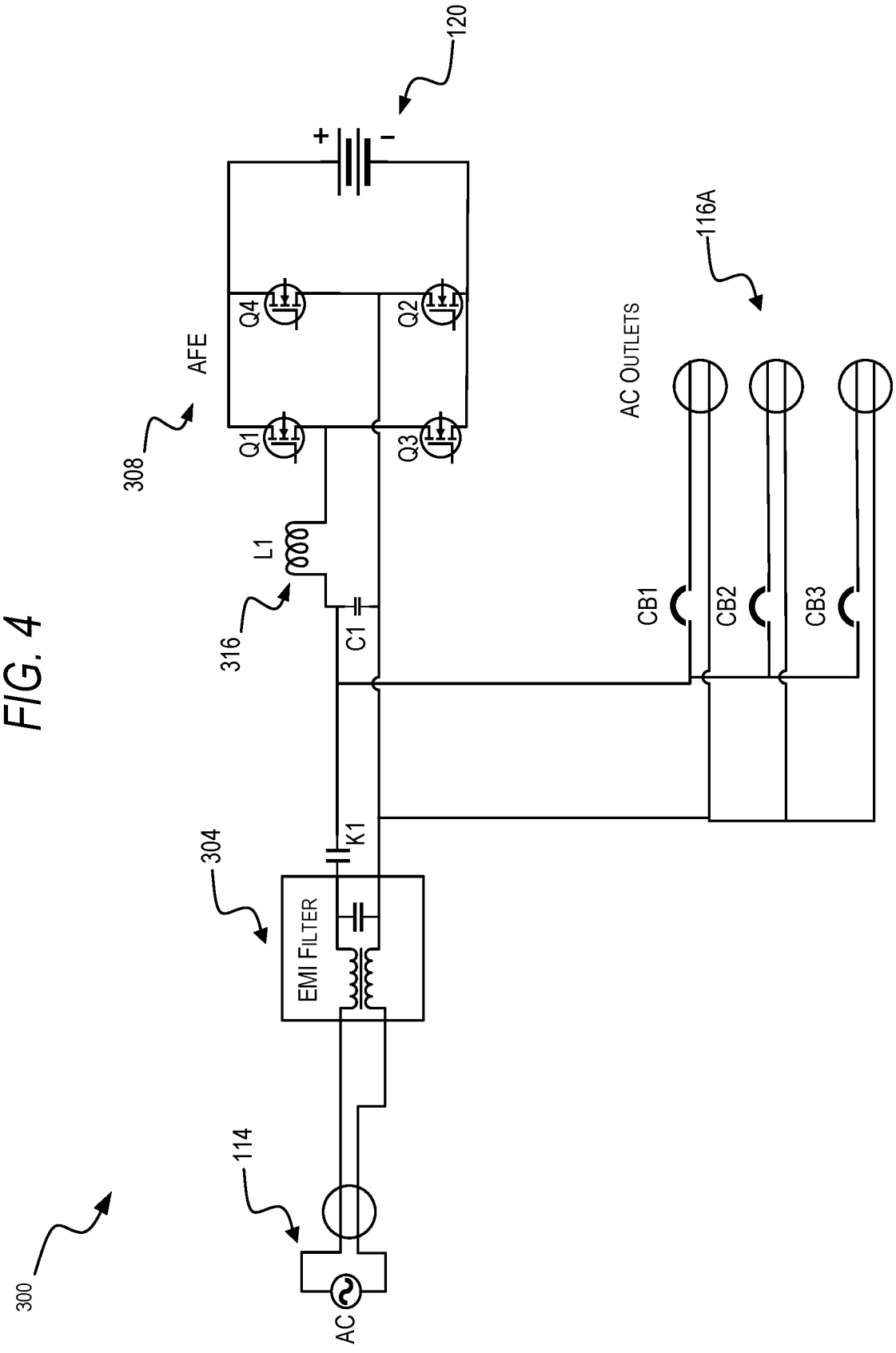
FIG. 4 illustrates a schematic diagram of a power system of the portable power supply device of FIG. 1, according to some embodiments.

FIG. 4 is a schematic diagram of a first topology of the power system circuit 300 of FIG. 3. The at least one switch 312 includes a first switch K1. In some embodiments, the at least one switch 312 is a relay. The first switch K1 is electrically connected between the output of the EMI filter 304 and the AFE 308 in order to selectively provide power from the AC power input interface 114 to the battery core 120. The battery core 120 may have a maximum voltage of at least 120V (e.g., 120V-500V). In some embodiments, the battery core 120 has a maximum voltage of at least 200V. The AFE 308 includes a plurality transistors (e.g., insulated-gate bipolar transistors) Q1, Q2, Q3, Q4 arranged in a bridge (e.g., an H-bridge) topology. An output filter 316 (e.g., a sine wave filter) is connected to the AFE 308 in order to provide low total harmonic distortion ("THD") of the AC power output from the AFE 308. The output filter 316 may be a sinusoidal filter, and includes at least one capacitor C1 (e.g., a sine wave filter capacitor) and at least one inductor L1. In some embodiments, the battery core 120 has a maximum voltage of at least 400V DC. Each of the AC power outlets 116A may include a respective one of a plurality of circuit breakers CB1, CB2, CB3 to protect an external device from damage that may be caused by an overcurrent event. In the illustrated embodiment, the power system circuit 300 includes three AC power outlets 116A. However, the number of AC outlets is not limited to three, and may be more than three or less than three.

The first switch K1 is controlled by the controller 200 and enables the power supply 100 to operate in, for example, an AC bypass mode, an AC passthrough mode, a DC discharge mode, or an idle mode. In some embodiments, additional modes of operation are included.

When operating in the AC bypass mode, the first switch K1 is closed and the AFE 308 is disabled. As a result, AC power flows directly from the AC power input interface 114 to the AC power outlets 116A.

When operating in AC passthrough mode, the first switch K1 is closed and the AFE 308 is enabled to provide power to the battery core 120. The AC passthrough mode may alternatively be referred to herein as a charge mode for charging the battery core 120. AC power also still flows directly from the AC power input interface 114 to the AC power outlets 116A.

When operating in the DC discharge mode, the first switch K1 is open to disconnect the AC power input interface 114 from the power system circuit 300, and the AFE 308 is enabled to provide power from the battery core 120 to the AC power outlets 116A. When operating in idle mode, the first switch K1 is open and the AFE 308 is disabled. No power is provided to the AC power outlets 116A, and the battery core 120 is not being charged.

FIGS. 5-10 are schematic diagrams of respective second, third, fourth, fifth, sixth, and seventh topologies of the power system circuit 300 that may be implemented in place of the first topology described above with reference to FIG. 4. Operation of the power supply 100 according to each topology is substantially similar. Accordingly, similar components of the first topology, the second topology, the third topology, and the fourth topology are identified with common reference numerals. Differences among the first, second, third, fourth, fifth, sixth, and seventh topologies are described below.

Figure 5:
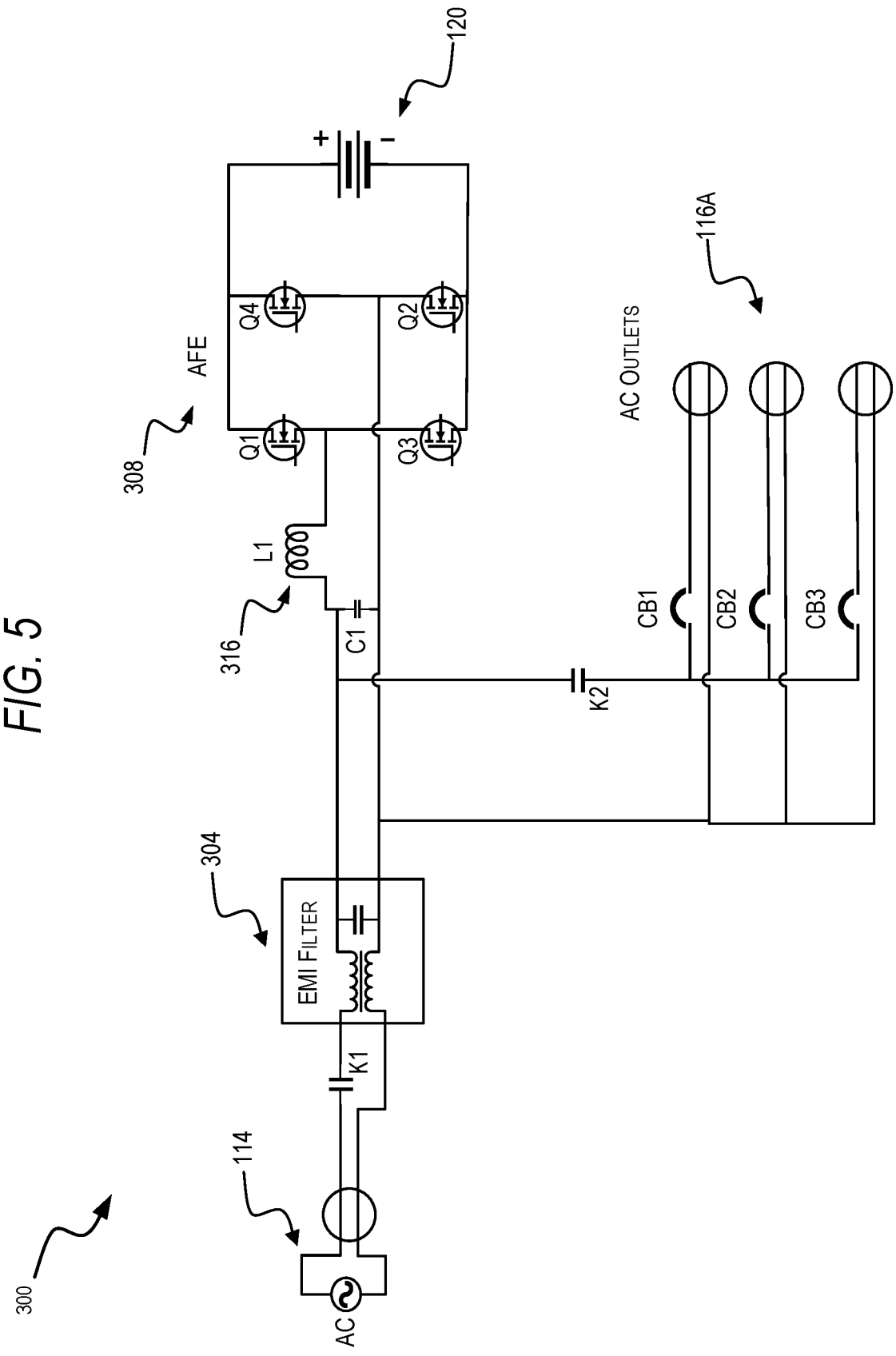
FIG. 5 illustrates a schematic diagram of a power system of the portable power supply device of FIG. 1, according to some embodiments.

Referring now to FIG. 5, first switch K1 may be electrically connected between the AC power input interface 114 and the EMI filter 304 in order to selectively provide power from the AC power input interface 114 to the battery core 120. Similar to the first topology described above with reference to FIG. 4, when operating in the AC bypass mode, the first switch K1 is closed and the AFE 308 is disabled. When operating in AC passthrough mode, the first switch K1 is closed and the AFE 308 is enabled to provide power to the battery core 120. AC power also still flows directly from the AC power input interface 114 to the AC power outlets 116A. When operating in the DC discharge mode, the first switch K1 is open to disconnect the AC power input interface 114 from the power system circuit 300, and the AFE 308 is enabled to provide power from the battery core 120 to the AC power outlets 116A. When operating in idle mode, the first switch K1 is open and the AFE 308 is disabled. In some embodiments, the power system circuit 300 can optionally include a second switch K2 connected between the EMI filter 304, the AFE 308, and the AC power outlets 116A to control power output to the AC power outlets 116A.

Figure 6:
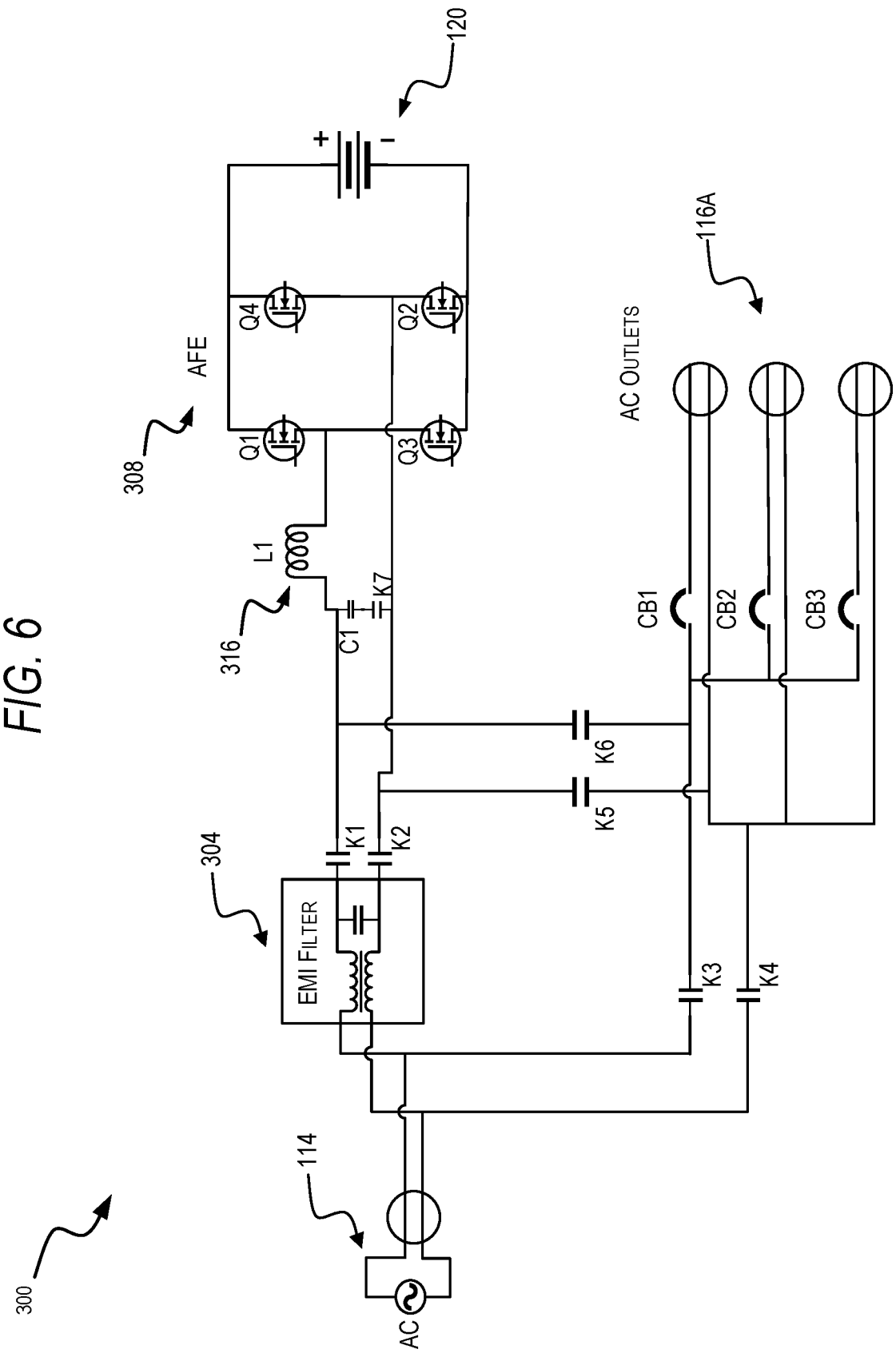
FIG. 6 illustrates a schematic diagram of a power system of the portable power supply device of FIG. 1, according to some embodiments.

Referring now to FIG. 6, the at least one switch 312 may include two first switches K1 and K2 electrically connected between the output of the EMI filter 304 and the AFE 308 in order to selectively provide power from the AC power input interface 114 to the battery core 120. The at least one switch 312 may further include second switches K3 and K4, third switches K5 and K6, and a fourth switch K7. The fourth switch K7 can selectively connect the output filter 316 to the power system circuit 300. Second switches K3 and K4 are electrically connected between the AC power input interface 114 and the AC power outlets 116A for selectively providing AC power directly from the AC power input interface 114 to the power output interface 116. Second switches K5 and K6 are electrically connected between the output filter 316 of the AFE 308 and the AC power outlets 116A in order to selectively provide power from the battery core 120 to the power output interface 116. In some embodiments, the switches K1 and K2, K3 and K4, and K5 and K6 are alternatively provided as single switches rather than switch pairs in order to, for example, reduce the number of components included in the power system circuit 300.

Figure 7:
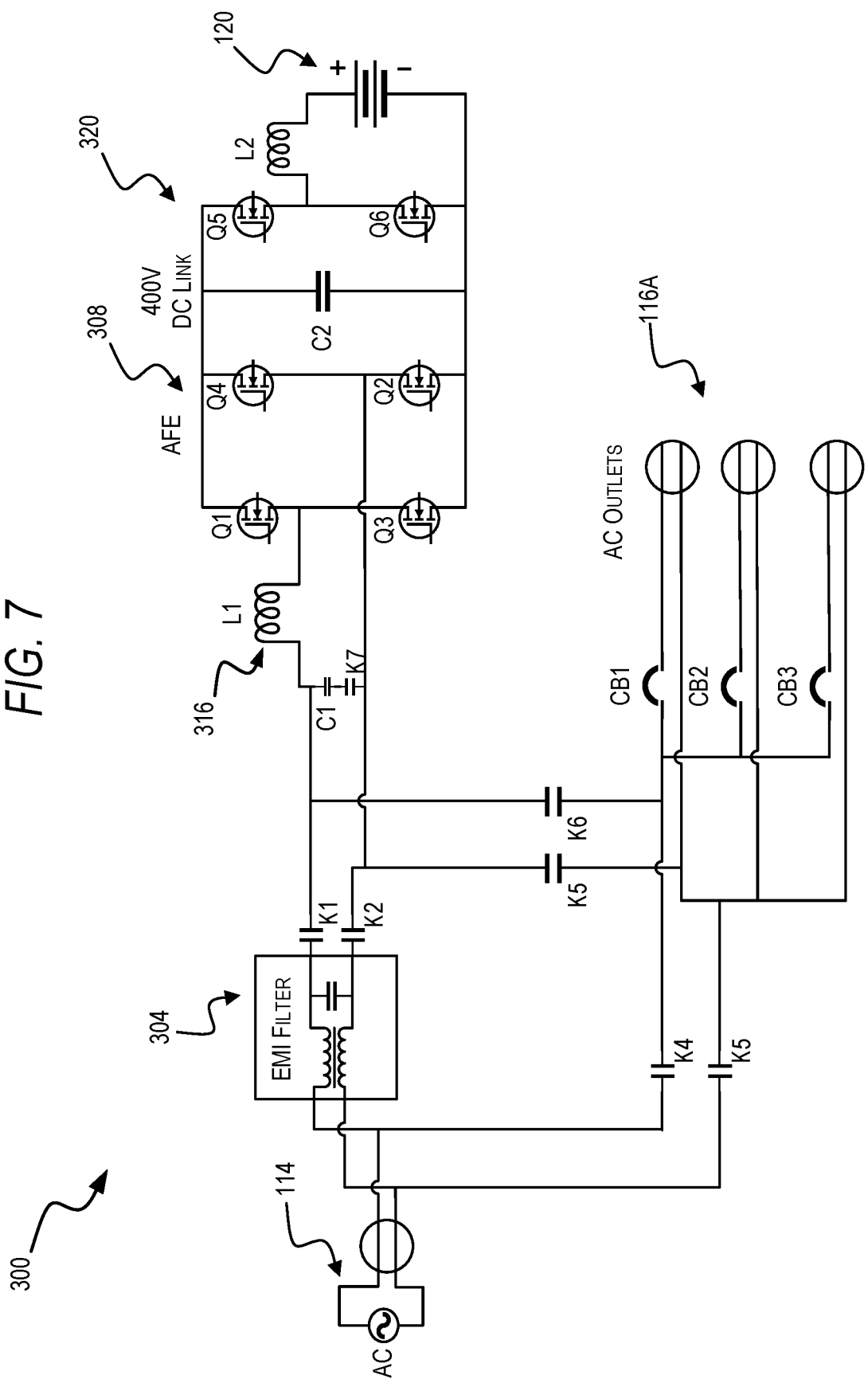
FIG. 7 illustrates a schematic diagram of a power system of the power supply device of FIG. 1, according to some embodiments.

Referring now to FIG. 7, the power system circuit 300 may further include a DC-DC power converter 320 electrically connected between the AFE 308 and the battery core 120. In the embodiment illustrated in FIG. 7, the DC-DC power converter 320 is a non-isolated DC-DC power converter. The DC-DC power converter 320 may be implemented in a variety of manners. For example, the DC-DC converter 320 may be implemented as a buck converter, a boost converter, a buck-boost converter, a switched capacitor converter, a single-ended primary-inductor converter (SEPIC), or the like. In the illustrated embodiment, the DC-DC power converter 320 includes a capacitor C2 (e.g., an energy storage capacitor) connected in parallel with two series connected transistors Q5 and Q6. An inductor L2 is connected between the two transistors Q5 and Q6 to a positive power terminal of the battery core 120. The DC-DC converter 320 enables the power supply 100 to operate with a battery core 120 having a maximum voltage less than 400V. In some embodiments, the battery core 120 may have a maximum voltage greater than, less than, or equal to 400V (DC).

Figure 8:
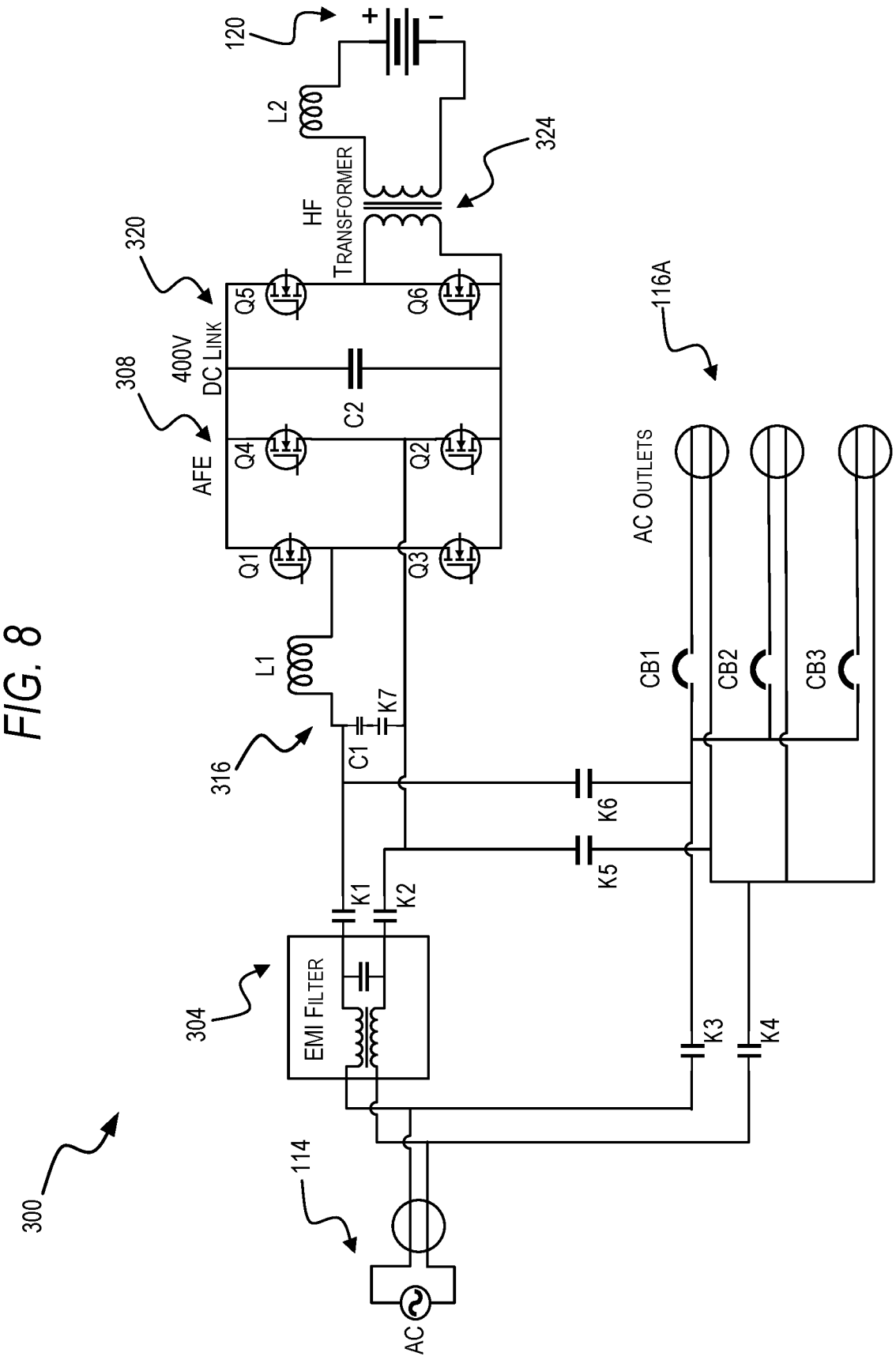
FIG. 8 illustrates a schematic diagram of a power system of the power supply device of FIG. 1, according to some embodiments.

Referring now to FIG. 8, the DC-DC power converter 320 may also include a high-frequency ("HF") isolation transformer 324. The HF isolation transformer 324 provides isolation between the AC power input interface 114, AC power outlets 116A, and the battery core 120. The isolated DC-DC converter 320 may again be implemented in various manners. For example, the isolated DC-DC converter 320 may be implemented as a dual active bridge ("DAB") or a CLLC converter. In the illustrated embodiment, the isolated DC-DC converter 320 includes the capacitor C2, the transistors Q5 and Q6, and the inductor L2, as described above with respect to FIG. 7. The HF isolation transformer 324 is connected between the inductor L2 and the transistors Q5 and Q6. In the illustrated embodiment, the battery core 120 may have a maximum voltage greater than, less than, or equal to 400V (DC).

Figure 9:
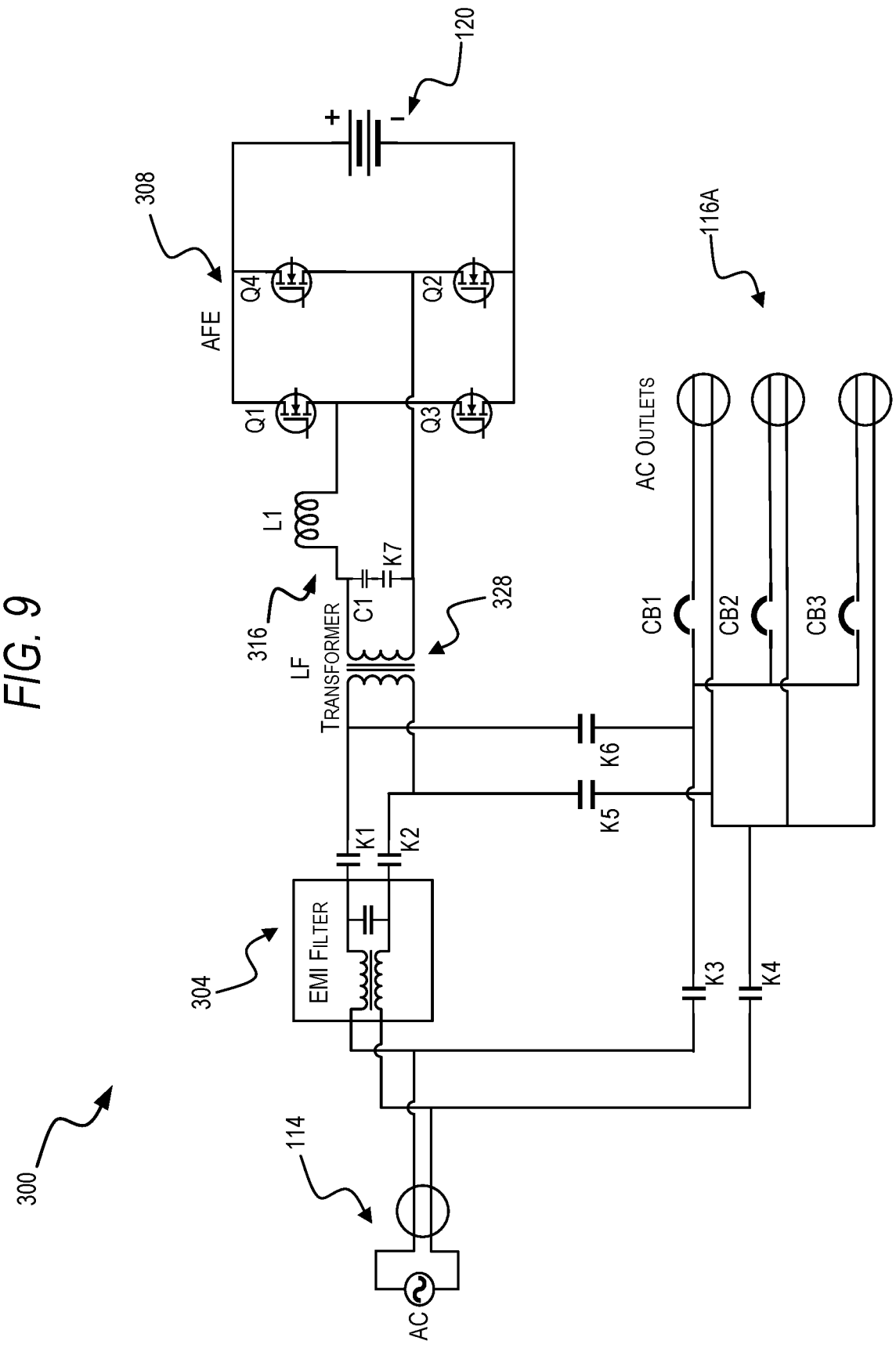
FIG. 9 illustrates a schematic diagram of a power system of the power supply device of FIG. 1, according to some embodiments.

Referring now to FIG. 9, the power system circuit 300 may include a low-frequency ("LF") isolation transformer 328 electrically connected between the first switches K1 and K2, the second switches K5 and K6, and the output filter 316. The LF isolation transformer 328 provides isolation between the AC power input interface 114, AC power outlets 116A, and the battery core 120. In the illustrated embodiment, the battery core 120 may have a maximum voltage greater than, less than, or equal to 400V (DC).

Figure 10:
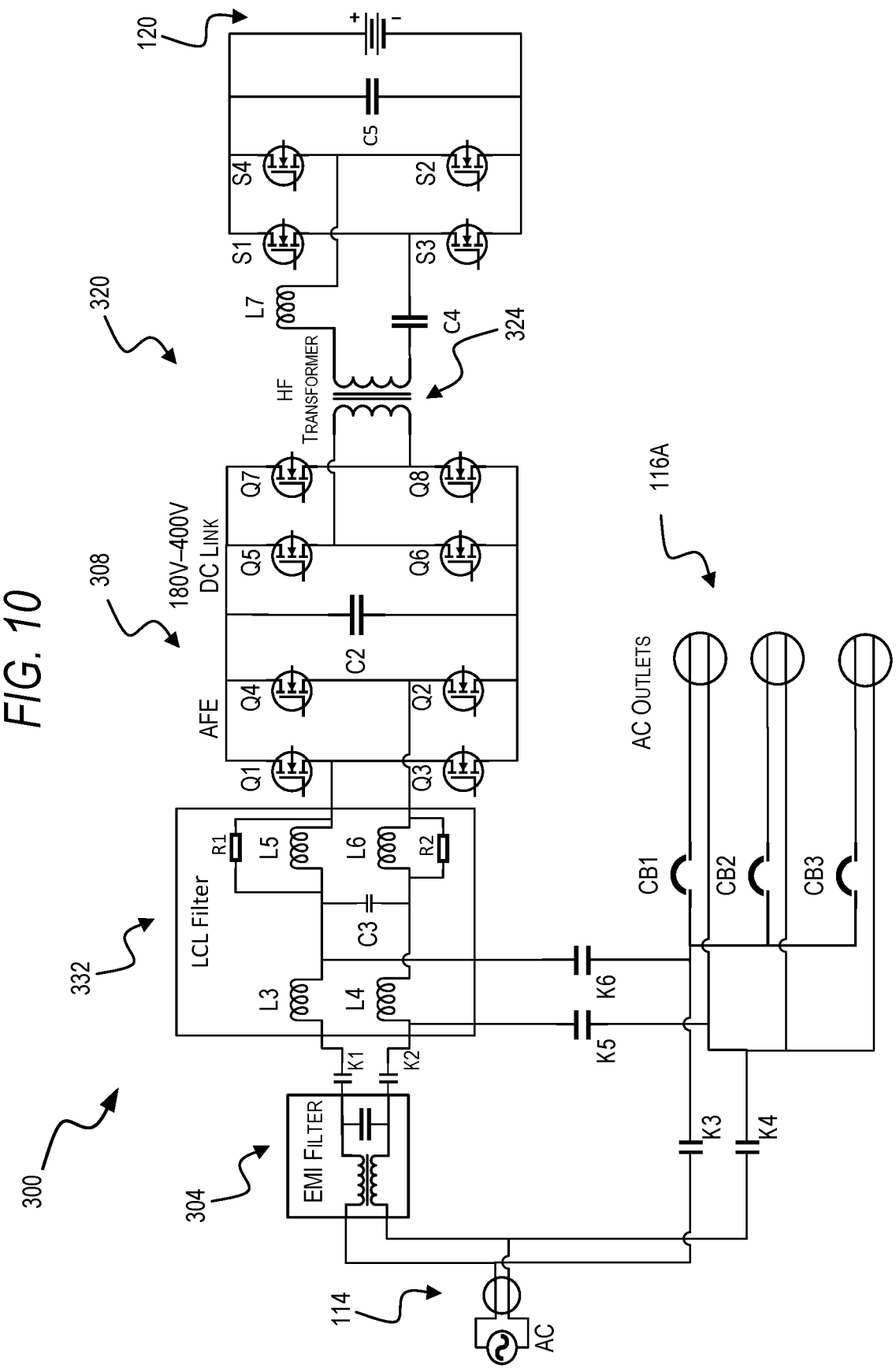
FIG. 10 illustrates a schematic diagram of a power system of the power supply device of FIG. 1, according to some embodiments.

Referring now to FIG. 10, the power system circuit 300 may include an inductor-capacitor-inductor ("LCL") filter 332 for reducing harmonics in the power system circuit 300. The LCL filter includes inductors L3, L4, L5, and L6, capacitor C3, and damping resistors R1 and R2. The LCL filter is electrically connected between the first switches K1 and K2, the second switches K5 and K6, and the AFE 308. The AFE 308 includes switches Q1, Q2, Q3, and Q4. In the example illustrated in FIG. 10, the DC-DC power converter 320 is implemented as a DAB converter 320 including capacitors C2, C4, and C5, an inductor L7, transistors Q5, Q6, Q7, and Q8 arranged in a first bridge, transistors S1, S2, S3, and S4 arranged in a second bridge, and the HF isolation transformer 324. However, as described above, the DC-DC power converter 320 may be implemented in another manner. Additionally, although the seventh topology illustrated in FIG. 10 is shown without the fourth switch K7, in some instances, the seventh topology of the power system circuit 300 includes the seventh switch K7.

With respect to the third, fourth, fifth, sixth, and seventh topologies for the power system circuit 300 described above, each of the at least one switch 312 is controlled by the controller 200 and enables the power supply 100 to operate in the AC bypass mode, the AC passthrough mode, the DC discharge mode, or the idle mode. In some embodiments, additional modes of operation are included.

When operating in the AC bypass mode, the first switches K1 and K2 are open, second switches K3 and K4 are closed, third switches K5 and K6 are open, and the fourth switch K7 is open. As a result, AC power flows directly from the AC power input interface 114 to the AC power outlets 116A.

When operating in the AC passthrough mode, first switches K1 and K2 are closed, second switches K3 and K4 are closed, third switches K5 and K6 are open, and the fourth switch K7 is open. The AC passthrough mode enables power from the AC power input interface 114 to be simultaneously provided to both the AC power outlets 116A to power an external device, and to the AFE 308 to charge the battery core 120.

When operating in the DC discharge mode, first switches K1 and K2 are open, second switches K3 and K4 are open, third switches K5 and K6 are closed, and the fourth switch K7 is closed. In some embodiments, the fourth switch K7 is not closed or is intermittently closed (e.g., based on a pulse-width modulated [PWM] signal). The DC discharge mode enables the battery core 120 to supply power to the AC power outlets 116A via the AFE 308. When operating in idle mode, each of the at least one switch 312 is opened. No power is provided to the AC power outlets 116A, and the battery core 120 is not being charged.

Figure 11:
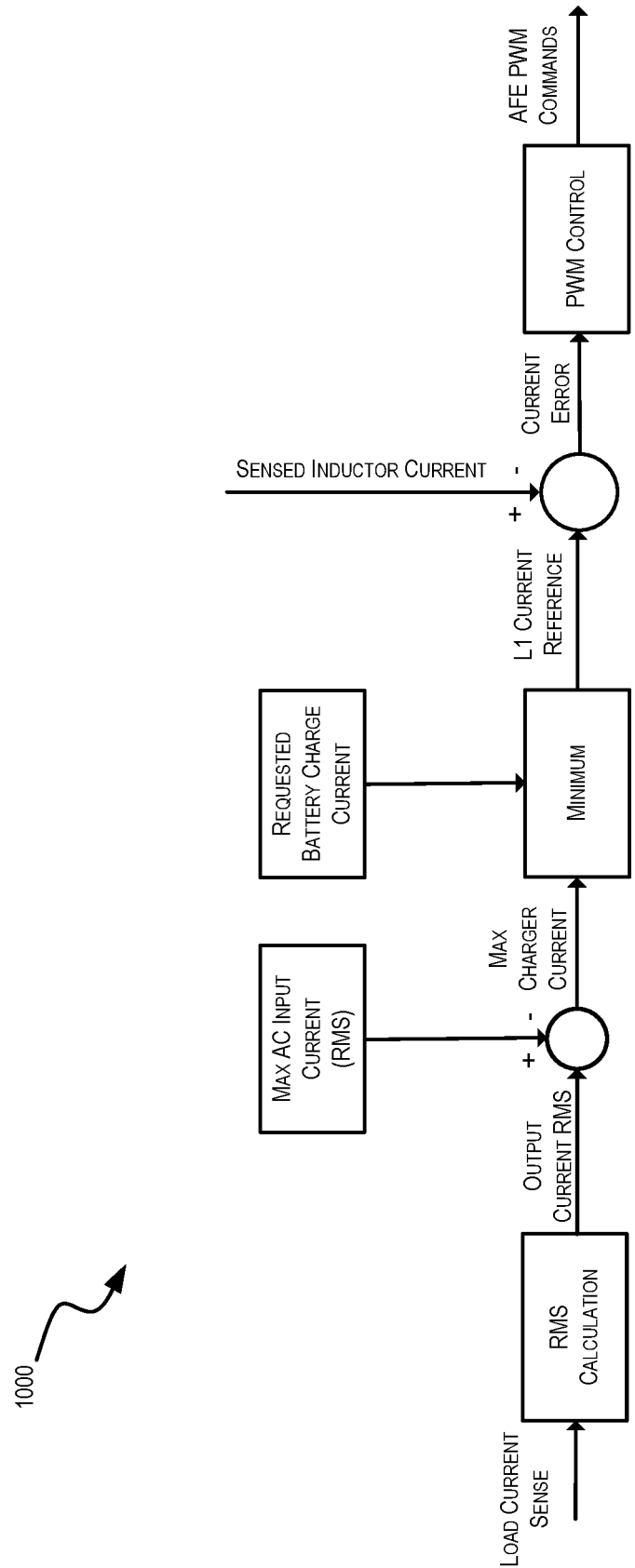
FIG. 11 illustrates a control process for controlling the portable power supply device of FIG. 1, according to some embodiments.

FIG. 11 illustrates a control process 1000 implemented by the controller 200 for controlling the power system circuit 300 during passthrough operation (i.e., the AC passthrough mode). The control process 1000 includes sensing the AC load current requested at the AC power outlets 116A, and the current through the inductor L1. The controller 200 determines the corresponding root mean square ("RMS") load current, and the difference between the RMS load current and a maximum RMS input current. For example, the maximum AC input current may be 15 Amps. Based on the difference between the maximum AC input current and the RMS load current, the controller 200 is configured to determine a maximum charging current that would be available to charge the battery core 120. The maximum charging current can be compared to a charge current requested by the battery core 120. The smaller of the maximum charging current and the charge current requested is selected and corresponds to a reference current for the inductor L1. The reference current for the inductor L1 is compared to a sensed current of the inductor L1 to produce a charge current error value. The charge current error value is provided to a PWM controller (e.g., within controller 200). The PWM controller is configured to control the current flowing through the inductor L1 by controlling a pulse width modulation ("PWM") command signal to control the transistors in the AFE 308. The PWM command signal can be adjusted to regulate the charging current provided to the battery core 120.

Figure 12:
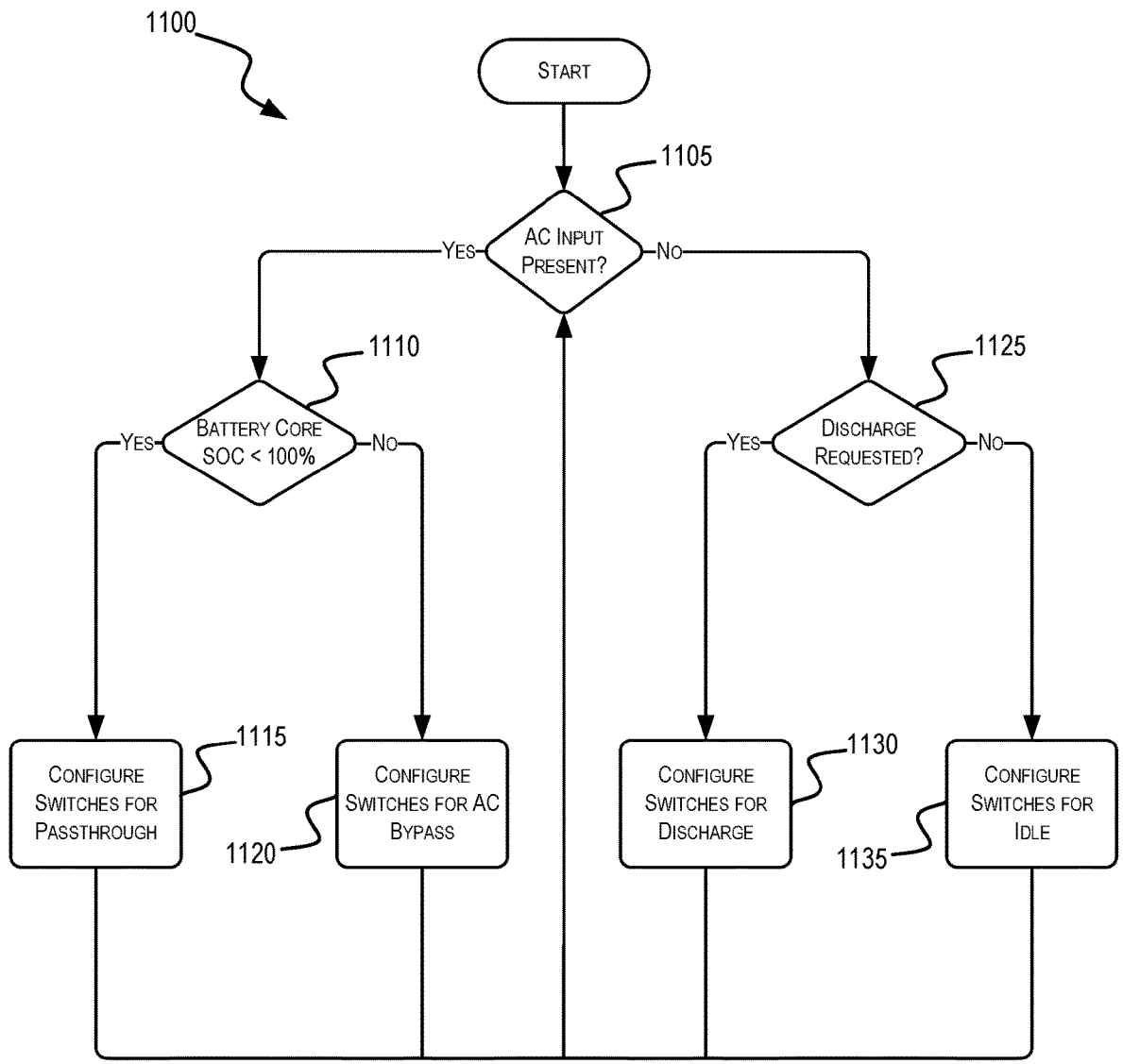
FIG. 12 illustrates a method for operating the portable power supply device of FIG. 1, according to some embodiments.

FIG. 12 illustrates a method 1100 implemented by the controller 200 for operating the portable power supply 100 in the AC bypass mode, the passthrough mode, the DC discharge mode, or the idle mode. The method 900 includes repeatedly determining if AC power is present at the AC power input interface 114 (STEP 1105). If AC power is present at STEP 1105, the controller 200 determines the state of charge ("SOC") of the battery core 120 (STEP 1110). If the controller 200 determines that the battery core 120 is less than fully charged, the controller 200 controls the power supply 100 for operation in AC passthrough mode (STEP 1115), and charges the battery core 120 while providing power to the AC power outlets 116A. In contrast, if the controller 200 determines that the battery core 120 is fully charged, the controller 200 controls the power supply 100 for operation in AC bypass mode (STEP 1120), and does not charge the battery core 120.

If, at STEP 1105, the controller 200 determines that AC power is not present at the AC power input interface 114, the controller 200 determines if AC power is requested at the AC power outlets 116A (STEP 1125). If AC power is requested at the AC power outlets 116A, the controller 200 controls the power supply 100 for operation in DC discharge mode (STEP 1130), and supplies power to the AC power outlets 116A via the battery core 120 and the AFE 308. In contrast, if the controller 200 determines that AC power is not present at the AC power input interface 114 and AC power is not requested at the AC power outlets 116A, the controller 200 controls the power supply 100 for operation in the idle mode.

Although aspects of the present disclosure have been described in detail with reference to certain embodiments, variations and modifications exist within the scope and spirit of one or more independent aspects as described. Various features of the disclosure are set forth in the following claims.

What is claimed is:

1. A portable power supply comprising:
   an alternating current ("AC") power input interface;
   an AC power output interface;
   a battery core;
   at least one switch including a first switch electrically connected between the AC power input interface and the battery core, a second switch electrically connected between the AC power input interface and the AC power output interface, and a third switch electrically connected between the battery core and the AC power output interface; and
   a controller configured to control the at least one switch to selectively provide an AC power output to the AC power output interface based on power received from either the AC power input interface or the battery core.

2. The portable power supply of claim 1, further comprising:
   an electromagnetic interference ("EMI") filter electrically connected between the AC power input and the first switch; and
   a voltage converter electrically connected between the first switch and the battery core.

3. The portable power supply of claim 2, further comprising:
an output filter including an inductor and a capacitor, the output filter electrically connected between the voltage converter and the AC power output interface.

4. The portable power supply of claim 2 further comprising:
an inductor-capacitor-inductor ("LCL") filter electrically connected between the first switch and the voltage converter.

5. The portable power supply of claim 1, further comprising:
an electromagnetic interference ("EMI") filter electrically connected between the AC power input and the first switch; and
a voltage converter electrically connected between the first switch, the third switch, and the battery core.

6. The portable power supply of claim 5, further comprising:
an output filter including an inductor a capacitor, and a fourth switch, the output filter electrically connected between the voltage converter and the third switch.

7. The portable power supply of claim 6, wherein the battery core has a maximum voltage of at least 400V.

8. The portable power supply of claim 6, further comprising:
a low frequency isolation transformer electrically connected between the output filter, the first switch, and the third switch.

9. The portable power supply of claim 5, further comprising:
a DC-DC power converter electrically connected between the voltage converter and the battery core.

10. The portable power supply of claim 9, wherein the battery core has a maximum voltage of less than 400V.

11. The portable power supply of claim 9, wherein the DC-DC power converter includes a high-frequency isolation transformer.

12. A method for operating a portable power supply, the method comprising:
receiving power from either an alternating current ("AC") power input interface of the portable power supply or a battery core of the power supply; and
controlling at least one switch of the portable power supply to selectively provide an AC power output to an AC power output interface based on power received from either the AC power input interface of the portable power supply or the battery core of the portable power supply, the at least one switch including a first switch electrically connected between the AC power input interface and the battery core, a second switch electrically connected between the AC power input interface and the AC power output interface, and a third switch electrically connected between the battery core and the AC power output interface.

13. The method of claim 12, further comprising:
determining whether AC power is present at the AC power input interface;
determining, in response to AC power being present at the AC power input interface, a state of charge of the battery core; and
controlling, in response to the state of charge of the battery core being less than fully charged, the at least one switch for operation of the portable power supply in an AC passthrough mode,
wherein, when in the AC passthrough mode, AC power is provided from the AC power input interface to the AC power output interface and the battery core.

14. The method of claim 12, further comprising:
determining whether AC power is present at the AC power input interface;
determining, in response to AC power being present at the AC power input interface, a state of charge of the battery core;
controlling, in response to the state of charge of the battery core being fully charged, the at least one switch for operation of the portable power supply in an AC bypass mode,
wherein, when in the AC bypass mode, AC power is provided from the AC power input interface to the AC power output interface.

15. The method of claim 12, further comprising:
determining whether AC power is present at the AC power input interface;
determining, in response to AC power not being present at the AC power input interface, whether AC power is requested at the AC power output interface;
controlling, in response to determining that AC power is requested at the AC power output interface, at least one switch for operation of the portable power supply in a DC discharge mode,
wherein, when in the DC discharge mode, power is provided from the battery core to the AC power output interface.

16. The method of claim 12, further comprising:
determining whether AC power is present at the AC power input interface;
determining, in response to AC power not being present at the AC power input interface, whether AC power is requested at the AC power output interface;
controlling, in response to determining that AC power is not requested at the AC power output interface, at least one switch for operation of the portable power supply in an idle mode,
wherein, when in the idle mode, power is provided to neither the AC power output interface nor the battery core.

17. A portable power supply comprising:
an internal power source configured to provide power to a device connected to the portable power supply;
a power input interface configured to charge the internal power source;
a power output interface;
at least one switch including a first switch electrically connected between the power input interface and the internal power source, a second switch electrically connected between the AC power input interface and the AC power output interface, and a third switch electrically connected between the battery core and the AC power output interface; and
a controller configured to:
determine whether power is present at the power input interface; and
control at least one switch of the portable power supply to selectively provide power to a power output interface from either the power input interface or the internal power source based on the determination.

18. The portable power supply of claim 17, wherein the controller is further configured to:
determine, in response to power being present at the power input interface, a state of charge of the internal power source; and control, in response to the state of charge of the internal power source being less than a threshold, the at least one switch for operation of the portable power supply in a passthrough mode, wherein, when in the passthrough mode, power is provided from the power input interface to the power output interface and the internal power source.

19. The portable power supply of claim 17, wherein the controller is further configured to:

determine, in response to power being present at the power input interface, a state of charge of the internal power source; and controlling, in response to the state of charge of the internal power source meeting or exceeding a threshold, the at least one switch for operation of the portable power supply in a bypass mode, wherein, when in the bypass mode, power is provided from the power input interface to the power output interface.

\* \* \* \* \*